(No Model.) 6 Sheets—Sheet 2.

A. O. HURLEY.
GLASS HEATING OVEN.

No. 478,328. Patented July 5, 1892.

WITNESSES.

INVENTOR.
Andrew Orvil Hurley
by his attorneys
W. Bakewell & Sons (No Model.) 6 Sheets—Sheet 3.
A. O. HURLEY.
GLASS HEATING OVEN.
No. 478,328. Patented July 5, 1892.
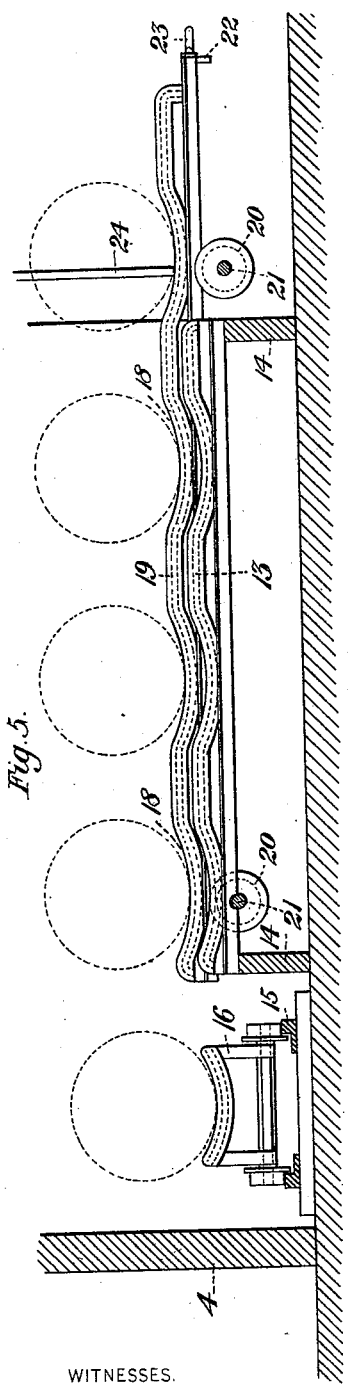
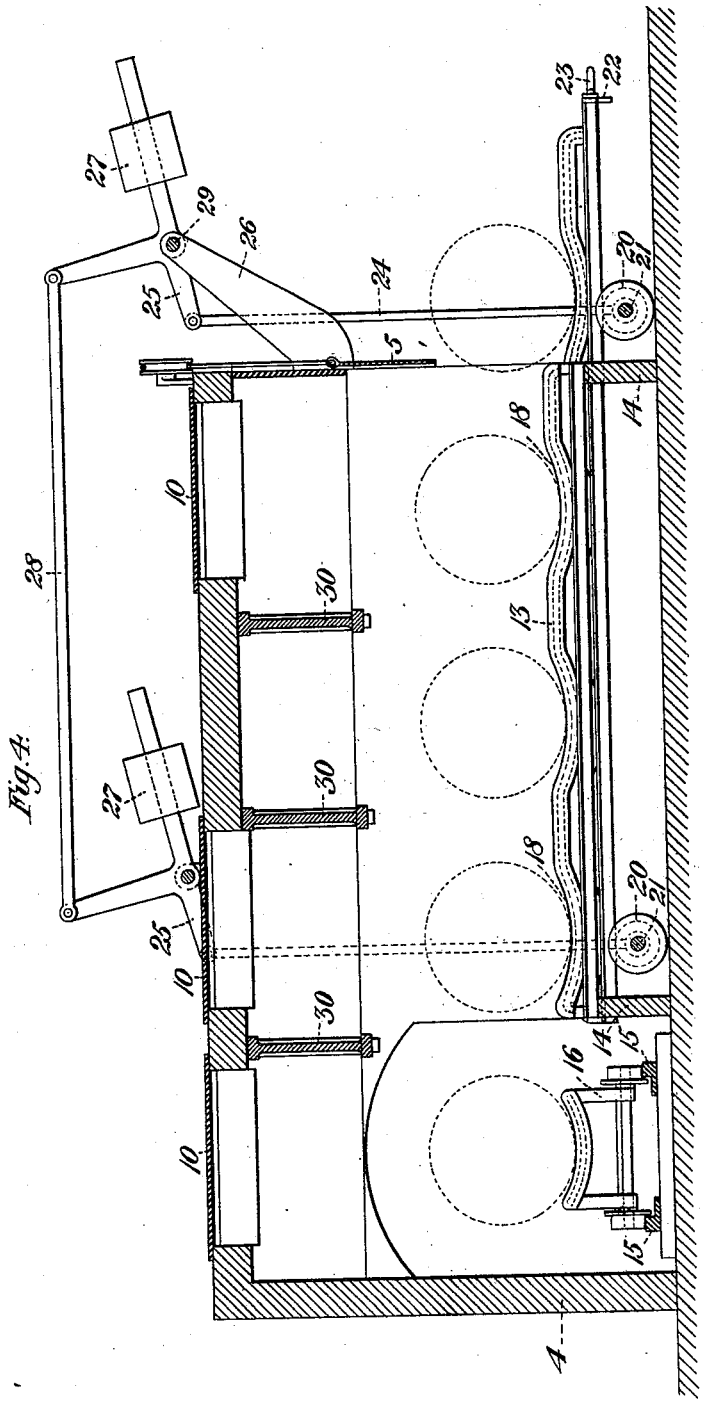
WITNESSES. INVENTOR.

(No Model.)
6 Sheets—Sheet 4.
A. O. HURLEY.
GLASS HEATING OVEN.
No. 478,328.  Patented July 5, 1892.
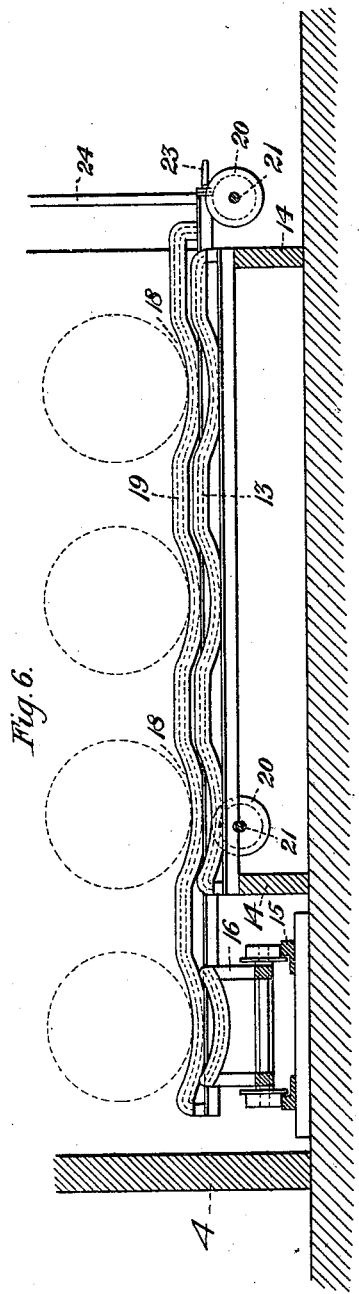
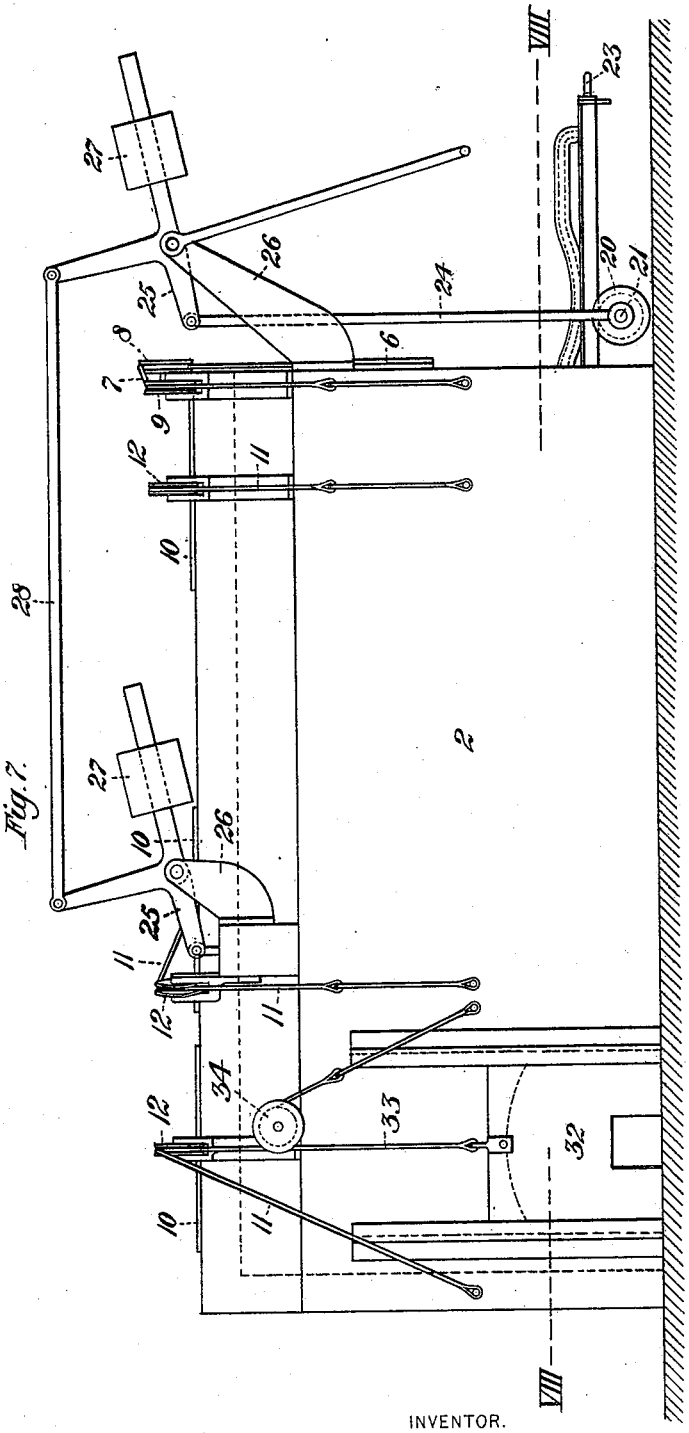
WITNESSES.
INVENTOR.
Andrew Orvel Hurley
by his attorneys
W. Bakewell & Sons (No Model.) 6 Sheets—Sheet 5.

A. O. HURLEY.
GLASS HEATING OVEN.

No. 478,328. Patented July 5, 1892.

WITNESSES
Warren H Swartz
H M Corwin

INVENTOR
Andrew O. Hurley
by W. Bakewell & Sons
his Attorneys (No Model.) 6 Sheets—Sheet 6.

A. O. HURLEY.
GLASS HEATING OVEN.

No. 478,328. Patented July 5, 1892.

WITNESSES.

INVENTOR.

Andrew Orvel Hurley
by his attorneys.
W. Bakewell & Sons

UNITED STATES PATENT OFFICE.

ANDREW O. HURLEY, OF JEANNETTE, PENNSYLVANIA.

GLASS-HEATING OVEN.

SPECIFICATION forming part of Letters Patent No. 478,328, dated July 5, 1892.

Application filed September 22, 1891. Serial No. 406,528. (No model.)

*To all whom it may concern:*

Be it known that I, ANDREW ORVEL HURLEY, of Jeannette, in the county of Westmoreland and State of Pennsylvania, have invented a new and useful Improvement in Glass-Heating Ovens, of which the following is a full, clear, and exact description, reference being had to the accompanying drawings, forming part of this specification, in which—

Figure 1:
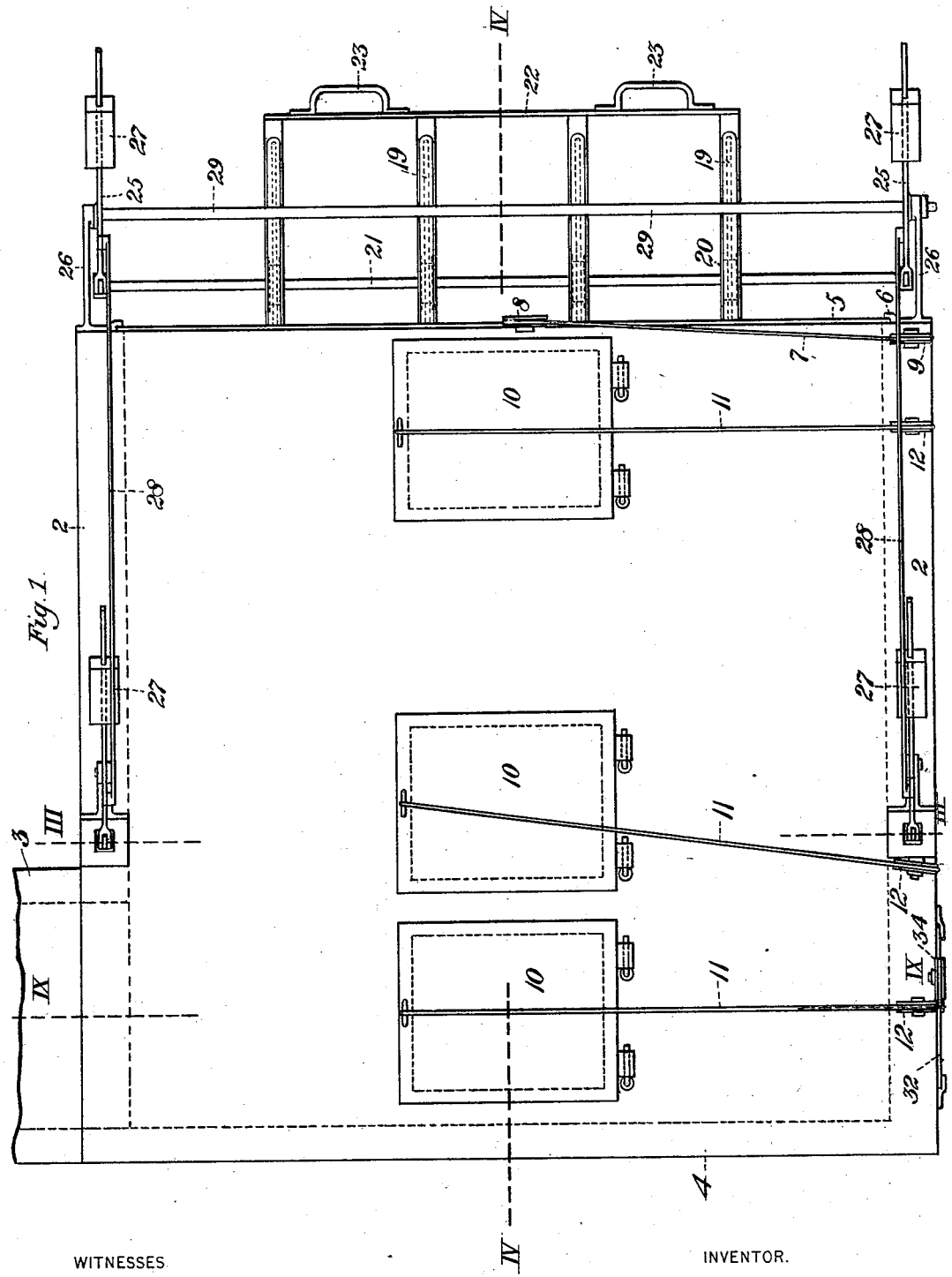
Figure 2:
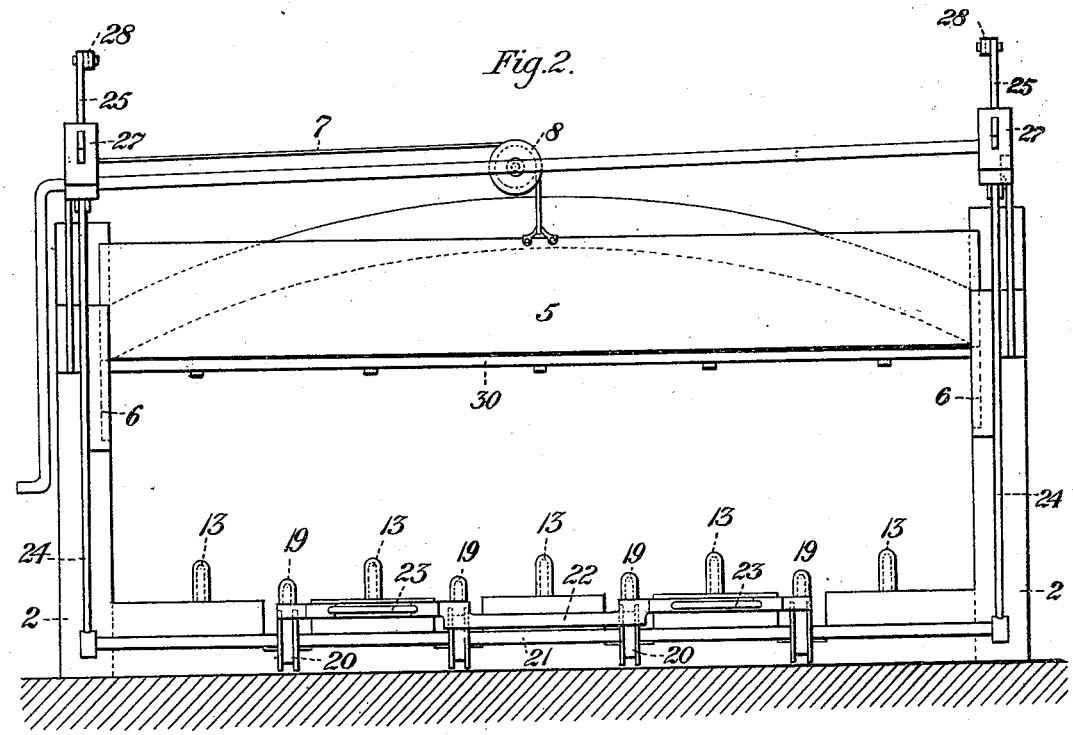
Figure 3:
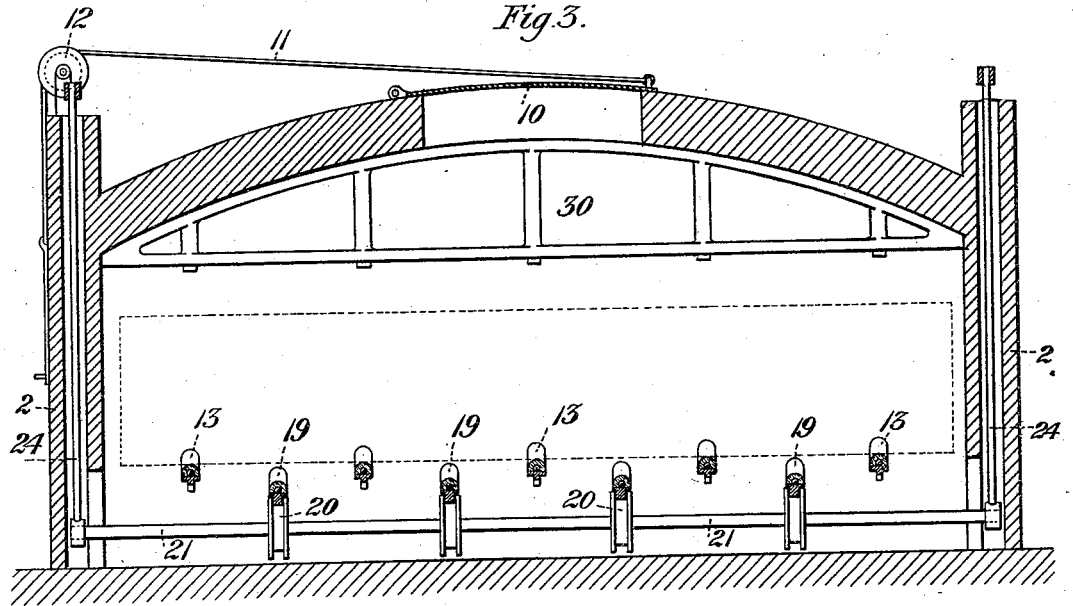
Figure 8:
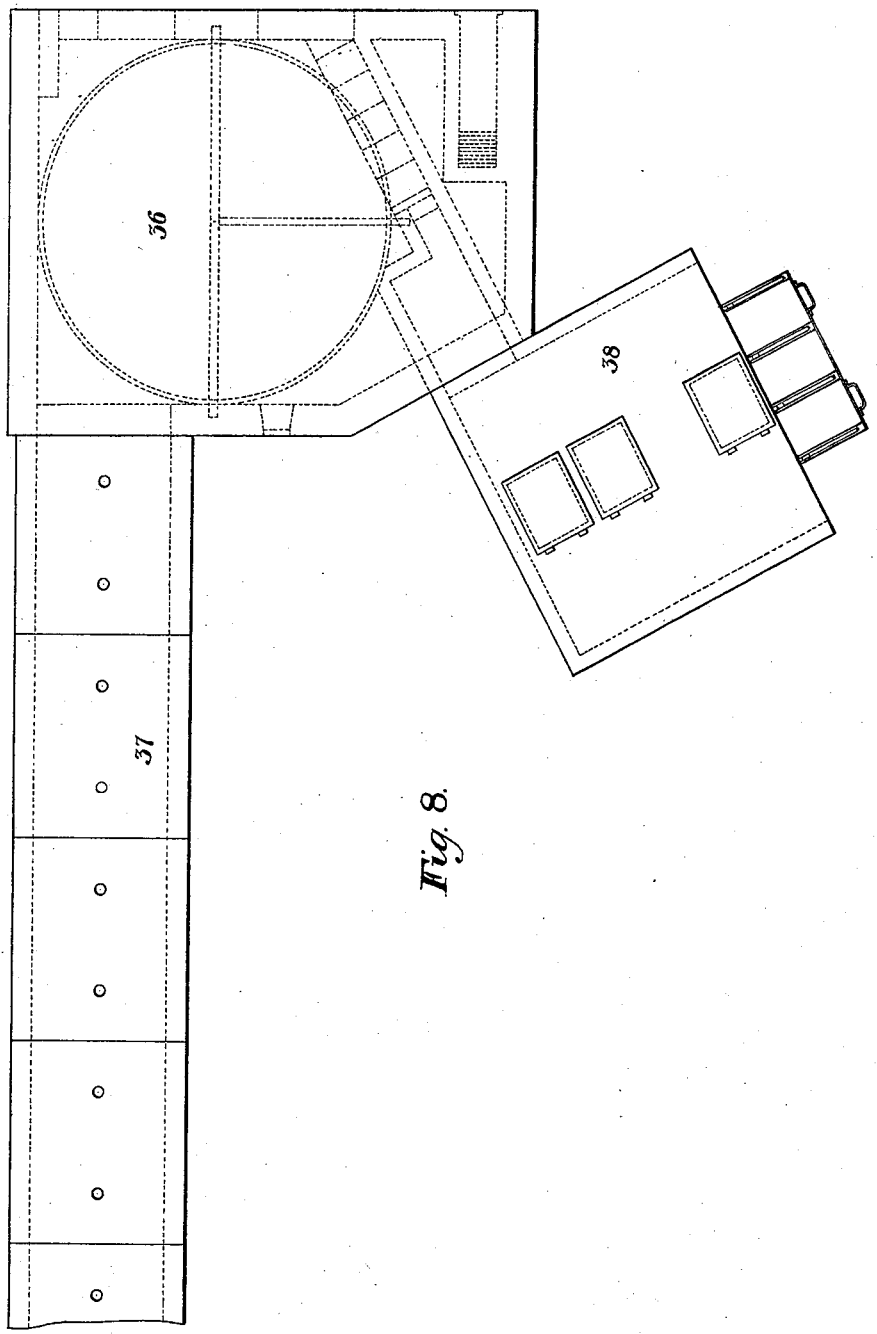
Figure 9:
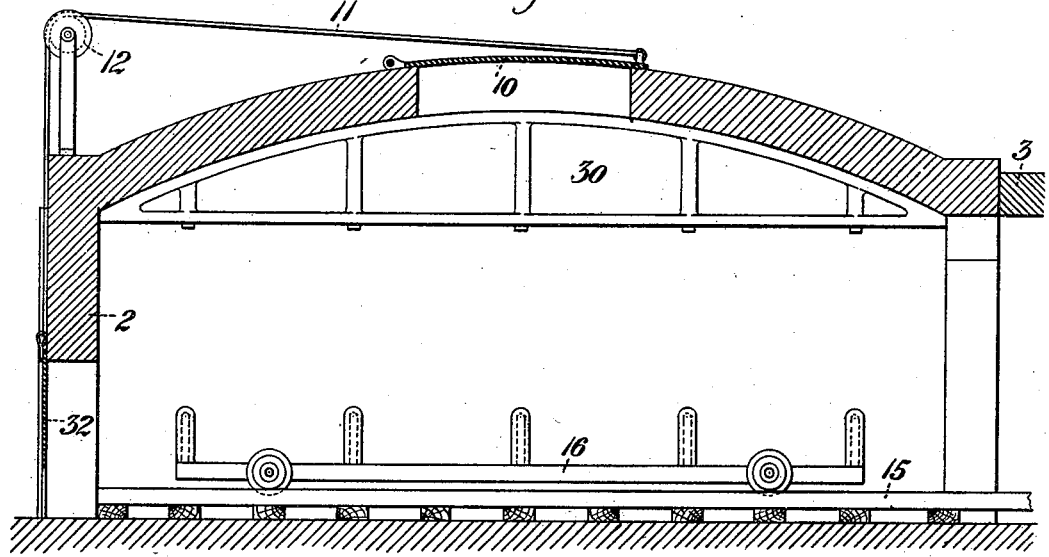
Figure 10:
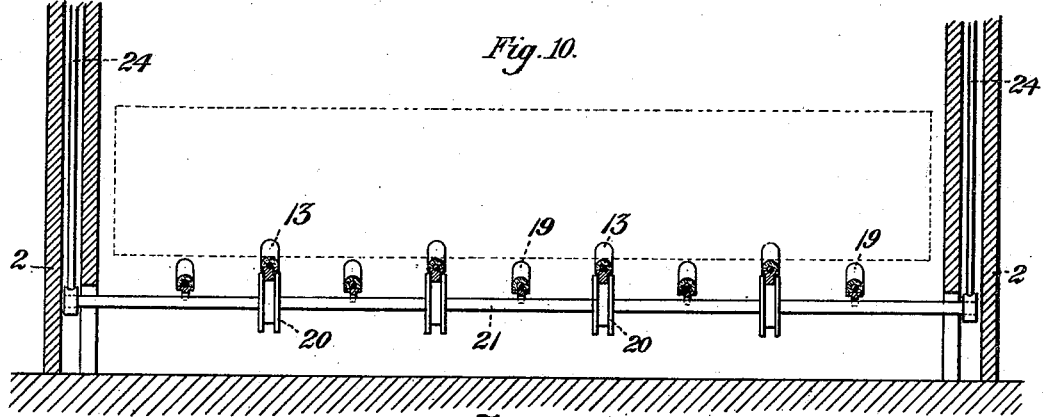
Figure 11:
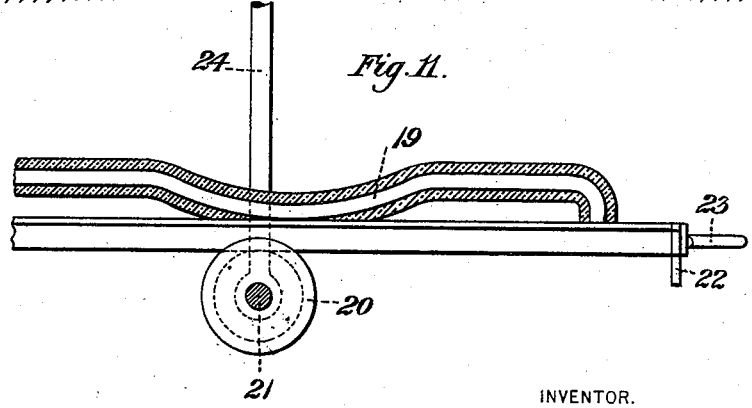

Figure 1 is a top plan view of my improved glass-feeding oven. Fig. 2 is a front elevation of the same. Fig. 3 is a cross-section on the line III III of Fig. 1. Fig. 4 is a longitudinal sectional view on the line IV IV of Fig. 1. Fig. 5 is a detail view showing the parts in a different position. Fig. 6 is a view similar to Fig. 5, showing the cylinder being deposited upon the car. Fig. 7 is a side elevation of the oven. Fig. 8 is a plan view of a flattening-oven provided with my improved heating-oven. Fig. 9 is a cross-section on the line IX IX of Fig. 1. Fig. 10 is a view similar to Fig. 3, with the parts in a different position; and Fig. 11 is an enlarged detail view of a part of the movable tray.

Like symbols of reference indicate like parts in each.

My invention relates to that class of devices employed in charging glass cylinders into the flattening-oven, and is designed to prevent the breakage constantly occurring from the sudden exposure of the cylinder to the intense heat of the flattening-oven. As now practiced, the glass cylinders are placed upon a car, which carries them directly from the external air into the furnace. In my invention the cylinders pass through a gradually-increasing temperature before reaching the flattening-oven, and hence are not broken from the sudden exposure to heat.

In the drawings, 2 indicates the side walls of an oven, which is located adjacent to the flattening-oven and is connected therewith by means of the passage-way 3, leading from one side of the oven near its end.

The rear of the oven is shut in by the end wall 4, while its front is open, and the opening is adjustable in height by means of the movable shield or mantel 5, which slides in guideways 6 and is held in its several positions by means of the rope 7, passing over pulleys 8 and 9 and secured to the side of the oven.

The roof of the oven is provided with three pivoted dampers 10, held in their various positions by means of ropes 11, passing over pulleys 12 and fastened to the side of the furnace.

The floor of the oven consists of stationary bars 13, spaced at suitable intervals apart and resting upon the foundation-walls 14. These stationary bars extend only a portion of the length of the oven, and beyond their rear ends and at right angles thereto extends the track 15, upon which rolls the car or truck 16. The track 15 extends from the feeding-oven through the covered passage 3 into the flattening-oven and terminates at a suitable point beside the flattening-wheel.

The relative positions of the heating-oven, flattening-oven, and leer are shown in Fig. 8, wherein 36 represents a flattening-oven, 37 a leer leading therefrom, and 38 my improved heating-oven through which the cylinders are fed.

The car 16 is provided with rests 17, suitably arranged to hold the glass cylinder placed thereon, and the bars 13 are provided at suitable intervals with registering depressions 18 to hold the cylinders deposited therein. To move the cylinders to the various positions on the bars 13 and car 16, I provide a movable set of bars 19, resting upon wheels 20, supported upon shafts 21. These bars are connected at their forward ends by the cross-bar 22, having the handles 23 and are otherwise unconnected. The shafts 21 are pivoted in lugs at the lower ends of vertical rods 24, which at their upper ends are pivotally connected with bell-crank levers 25, such levers being pivoted in brackets 26, secured to the walls of the ovens and provided with counterweights 27. The upper limbs of these levers are connected by the link 28, and the two front levers 25 are connected by the cross-shaft 29, as shown in Fig. 1. Suitable mantels 30 are provided, which depend from the roof between the depressions on the stationary bars and throw down the heat upon the cylinders and prevents its passing through too quickly. The rear set of rods 24 move in suitable vertical boxes 31, provided therefor within the walls, and like boxes may be provided for the forward set, if desired. A sliding door 32 is provided in the side of the oven opposite to the passage 3, said door being held in suitable position by a rope 33, passing over a pulley 34 and fastened to the oven-wall. This door has an opening 35 provided therein, so that when the door is closed a rod may be passed therethrough and attached to the car for pushing the car to its various positions on the track. Both the sets of bars and the supports upon the car 16 are covered with asbestus to prevent any scratching of the glass.

The operation is as follows: The movable set of bars, being lifted by means of a suitable handle attached to the cross-shaft 29, are drawn out far enough to allow a cylinder to be deposited thereon. The movable bars are then shoved in until the cylinder is directly over the first depressions in the stationary bars. The movable bars are then lowered, leaving the cylinder resting upon the stationary set of bars. This operation is repeated, each cylinder being moved forward a step as new cylinders enter, and as fast as the cylinders are deposited upon the car they are carried thereby into the flattening-oven. By means of the various dampers, doors, and mantels the heat in all parts of the oven can be regulated to a nicety, and as the heat will be the greatest as the flattening-oven (from which the heat issues) is approached the glass is subjected to a gradually-increasing degree of heat, and thus the breaking of the glass by a sudden change of temperature is obviated.

Many changes may be made in the form and arangement of the parts without departure from my invention, which I consider as lying, broadly, in the gradual feeding of the cylinders through an oven having a gradually-increasing temperature and then flattening them.

What I claim is—

1. A flattening-oven provided with a heating-oven leading thereto and a cooling-leer leading therefrom, and means located within the heating-oven for carrying the glass therethrough, and mechanism for transferring the glass therefrom into the flattening-oven and from the flattening-oven through the leer, substantially as and for the purposes described.

2. A flattening-oven provided with a heating-oven leading thereto and a cooling-leer leading therefrom, supports within the heating-oven, and means for carrying the cylinders forward on said supports successively nearer the flattening-oven, means for transferring them into said oven, and means for conveying the glass from the flattening-oven through the leer, substantially as and for the purposes described.

3. The combination, with a flattening-oven, of a heating-oven and a cooling-leer connected therewith, a car arranged to travel from the heating-oven into the flattening-oven, and means for carrying the cylinders forward through the heating-oven to the car, substantially as and for the purposes described.

4. The combination, with a flattening-oven, of a heating-oven connected therewith and a cooling-leer leading therefrom, a car arranged to move from the heating-oven into the flattening-oven, supports within the heating-oven, and means for carrying the cylinders forward into successive positions on the supports and for transferring them from the supports to the car, substantially as and for the purposes described.

5. The combination, with a flattening-oven, of a heating-oven connected therewith and a cooling-leer leading therefrom, supports within the heating-oven, movable bars arranged to carry the glass cylinders forward on the supports, and means for transferring the glass cylinders from the supports to the flattening-oven, substantially as and for the purposes described.

6. The combination, with a flattening-oven, of a heating-oven connected therewith and a cooling-leer leading therefrom, a car arranged to travel from the heating-oven into the flattening-oven, supports within the heating-oven, and movable bars also within the heating-oven and arranged to carry the cylinders forward into positions on the supports successively nearer the heating-oven and to transfer the cylinders from the supports to the car, substantially as and for the purposes described.

7. The combination, with a flattening-oven, of a heating-oven and a cooling-leer connected thereto, valved openings in the roof of the heating-oven, depending mantels between the openings, and means for carrying glass cylinders forward through the heating-oven into the flattening-oven, substantially as and for the purposes described.

8. The combination, with a flattening-oven, of a heating-oven and a cooling-leer connected thereto, supports and movable bars within the heating-oven, and means for vertically reciprocating the movable bars, said movable bars being arranged to feed the glass cylinders forward through the heating-oven, and means for transferring them therefrom into the flattening-oven, substantially as herein set forth.

9. The combination, with a flattening-oven, of a heating-oven connected thereto, a car having supports for cylinders thereon and arranged to travel from the heating-oven into the flattening-oven, and supports and movable bars within the heating-oven arranged to feed forward glass cylinders onto the car, said car-supports and bars being covered with asbestus, substantially as and for the purposes described.

10. The combination of a flattening-oven, a heating-oven connected therewith and a cooling-leer leading therefrom, a car arranged to travel from the heating-oven into the flattening-oven, stationary bars arranged within the heating-oven at substantially right angles with the track upon which the car moves, and movable bars between the stationary bars arranged to carry the cylinders forward to their successive positions upon the stationary bars and from the stationary bars onto the car, substantially as and for the purposes described.

11. The process of working glass, consisting in gradually feeding the cylinders through an oven having a gradually-increasing temperature, depositing them upon the flattening-table, and flattening them, substantially as set forth.

In testimony whereof I have hereunto set my hand this 14th day of September, A. D. 1891.

ANDREW O. HURLEY.

Witnesses:
W. B. CORWIN,
H. M. CORWIN.